US012562318B2

(12) United States Patent
Kusakabe et al.

(10) Patent No.: US 12,562,318 B2
(45) Date of Patent: Feb. 24, 2026

(54) CARBON PASTE FOR SOLID ELECTROLYTIC CAPACITORS, SOLID ELECTROLYTIC CAPACITOR ELEMENT, AND SOLID ELECTROLYTIC CAPACITOR

(71) Applicant: Panasonic Intellectual Property Management Co., Ltd., Osaka (JP)

(72) Inventors: Momo Kusakabe, Kyoto (JP); Yukihiro Shimasaki, Hyogo (JP); Takashi Ohbayashi, Osaka (JP); Junichi Kurita, Osaka (JP); Daisuke Kubo, Osaka (JP); Kenji Kuranuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 18/246,669

(22) PCT Filed: Oct. 25, 2021

(86) PCT No.: PCT/JP2021/039263
§ 371 (c)(1),
(2) Date: Mar. 24, 2023

(87) PCT Pub. No.: WO2022/092010
PCT Pub. Date: May 5, 2022

(65) Prior Publication Data
US 2023/0368983 A1 Nov. 16, 2023

(30) Foreign Application Priority Data
Oct. 30, 2020 (JP) ................................. 2020-183158

(51) Int. Cl.
*H01G 9/14* (2006.01)
*H01G 9/042* (2006.01)
(Continued)

(52) U.S. Cl.
CPC ............. *H01G 9/14* (2013.01); *H01G 9/0425* (2013.01); *H01G 9/055* (2013.01); *H01G 9/15* (2013.01)

(58) Field of Classification Search
CPC ........ H01G 9/14; H01G 9/0425; H01G 9/055; H01G 9/15
See application file for complete search history.

(56) References Cited

U.S. PATENT DOCUMENTS 6,185,091 B1 2/2001 Tanahashi et al.
7,443,651 B2 * 10/2008 Ando ..................... H01G 11/50
361/502

(Continued)

FOREIGN PATENT DOCUMENTS

JP 60-083012 5/1985
JP 11-288846 10/1999
(Continued)

OTHER PUBLICATIONS

International Search Report of PCT application No. PCT/JP2021/039263 dated Jan. 18, 2022.

*Primary Examiner* — Michael P McFadden
(74) *Attorney, Agent, or Firm* — Rimon P.C.

(57) ABSTRACT
A carbon paste for solid electrolytic capacitors contains first carbon particles in which an average particle size of primary particles is more than or equal to 40 nm and less than or equal to 100 nm. A proportion of the first carbon particles in a dried solid content is from 25 vol % to 75 vol %, inclusive.

20 Claims, 6 Drawing Sheets

(51) Int. Cl.
 *H01G 9/055* (2006.01)
 *H01G 9/15* (2006.01)

(56) References Cited

U.S. PATENT DOCUMENTS

| 9,025,312 | B2 * | 5/2015 | Ohmori | H01G 11/42 |
| | | | | 361/512 |
| 2004/0077814 | A1 * | 4/2004 | Nakamura | C08L 9/08 |
| | | | | 526/346 |
| 2008/0218945 | A1 * | 9/2008 | Ro | H01G 9/0425 |
| | | | | 29/25.03 |
| 2010/0165547 | A1 | 7/2010 | Kuranuki et al. | |
| 2010/0284128 | A1 * | 11/2010 | Kabe | H01G 9/14 |
| | | | | 361/523 |
| 2015/0014040 | A1 * | 1/2015 | Ahn | H05K 1/181 |
| | | | | 361/301.4 |
| 2019/0244765 | A1 | 8/2019 | Harada et al. | |
| 2021/0066708 | A1 * | 3/2021 | DuPasquier | C09C 1/46 |
| 2021/0336278 | A1 * | 10/2021 | Hori | H01M 4/9083 |

FOREIGN PATENT DOCUMENTS

| JP | 2001-316655 | | 11/2001 |
| JP | 2003-059338 | | 2/2003 |
| JP | 2004-079838 | A | 3/2004 |
| JP | 2007-042286 | | 2/2007 |
| JP | 2008-186590 | | 8/2008 |
| JP | 2011-175842 | A | 9/2011 |
| WO | 2009/028183 | | 3/2009 |
| WO | 2018/074408 | | 4/2018 |

* cited by examiner

CARBON PASTE FOR SOLID ELECTROLYTIC CAPACITORS, SOLID ELECTROLYTIC CAPACITOR ELEMENT, AND SOLID ELECTROLYTIC CAPACITOR

TECHNICAL FIELD

The present disclosure relates to a carbon paste for solid electrolytic capacitor elements, a solid electrolytic capacitor element, and a solid electrolytic capacitor.

BACKGROUND

A solid electrolytic capacitor includes a solid electrolytic capacitor element and a resin exterior body or a case that seals the solid electrolytic capacitor element. The solid electrolytic capacitor element includes a capacitor basic element including an anode body, a solid electrolyte layer, and the like, and a cathode body. More specifically, the capacitor basic element includes at least an anode body, a dielectric layer formed on a surface of the anode body, and a solid electrolyte layer containing a conductive polymer component covering at least a part of the dielectric layer. The capacitor basic element may include a carbon layer covering at least a part of the solid electrolyte layer.

International Publication WO 2018/074408 proposes a solid electrolytic capacitor in which a plurality of units each including a valve metal substrate having a porous layer on a surface thereof, a dielectric layer formed on a surface of the porous layer, and a solid electrolyte layer provided on the dielectric layer are stacked. In the solid electrolytic capacitor, a conductor layer exists between the stacked units, at least one of the conductor layers includes a metal foil, the unit and the conductor layer are sealed with an exterior resin. An anode-portion-side end surface of the valve metal substrate is directly connected to an anode external electrode formed on a surface of the exterior resin at one end surface of the solid electrolytic capacitor, and the metal foil is directly connected to a cathode external electrode formed on a surface of the exterior resin at the other end surface of the solid electrolytic capacitor.

SUMMARY

Capacitor performance such as equivalent series resistance (ESR) is influenced by an electrical connection state between the cathode body and the capacitor basic element in the solid electrolytic capacitor. Further improvement of the capacitor performance is required.

A carbon paste for solid electrolytic capacitors according to a first aspect of the present disclosure contains first carbon particles in which an average particle size of primary particles is more than or equal to 40 nm and less than or equal to 100 nm. A proportion of the first carbon particles in a dried solid content is from 25 vol % to 75 vol %, inclusive.

A solid electrolytic capacitor element according to a second aspect of the present disclosure includes a capacitor basic element, a cathode body, and a first carbon layer disposed between the capacitor basic element and the cathode body. The capacitor basic element includes an anode body, a dielectric layer disposed on a surface of the anode body, and a solid electrolyte layer covering at least a part of the dielectric layer. The first carbon layer contains first carbon particles in which an average particle size of primary particles is from 40 nm to 100 nm, inclusive, and a proportion of the first carbon particles in the first carbon layer is from 25 vol % to 75 vol %, inclusive.

A solid electrolytic capacitor according to a third aspect of the present disclosure includes at least one solid electrolytic capacitor element described above.

It is possible to provide the carbon paste, the solid electrolytic capacitor element, and the solid electrolytic capacitor capable of suppressing ESR to be low.

DESCRIPTION OF EMBODIMENT

Figure 1:
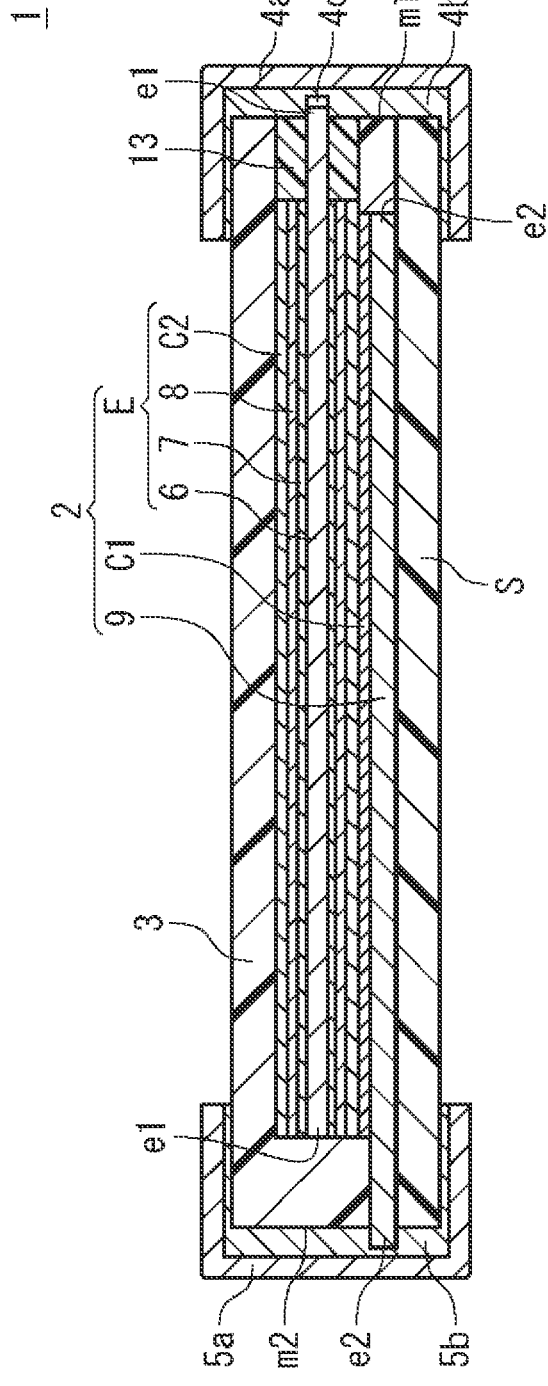
FIG. 1 is a schematic cross-sectional view illustrating a solid electrolytic capacitor according to a first exemplary embodiment of the present disclosure.

In a solid electrolytic capacitor, a capacitor basic element including an anode body, a solid electrolyte layer, and the like and a cathode body are generally in a state of being simply in contact with each other or in a state of being bound with a conductive adhesive layer interposed therebetween. In a state where the capacitor basic element and the cathode body are simply in contact with each other, a contact resistance between the capacitor basic element and the cathode body is large. Furthermore, adhesive strength between the capacitor basic element and the cathode body is low. Thus, when a solid electrolytic capacitor element including the capacitor basic element and the cathode body is sealed, the capacitor basic element and the cathode body are easily deviated. The deviation between the capacitor basic element and the cathode body may be referred to as stacking deviation in the present specification.

When the stacking deviation occurs, conductivity between the capacitor basic element and the cathode body is reduced, and capacitor performance is reduced, such as an increase in ESR. In addition, when the stacking deviation occurs, it is difficult to accommodate the solid electrolytic capacitor element in an intended space in a mold when the solid electrolytic capacitor element is sealed with a resin exterior body. As a result, a variation in thickness of the resin exterior body, which is formed on an outer side of the solid electrolytic capacitor element, increases. Thus, performance and strength of the solid electrolytic capacitor is reduced. Air easily enters a part where the thickness of the resin exterior body is small. When air enters an inside of the solid electrolytic capacitor, the solid electrolyte layer deteriorates or metal portions in the cathode body and the anode body are corroded by an action of moisture or oxygen contained in the air, and thus, capacitor performance is reduced. As a result, a product lifespan is shortened. In a case where the solid electrolytic capacitor includes a stacked body of a plurality of solid electrolytic capacitor elements, a degree of stacking deviation increases in the entire stacked body even slightly in one solid electrolytic capacitor element. Thus, in an exterior body where the solid electrolytic capacitor includes the stacked body of the plurality of solid electrolytic capacitor elements, the thickness of the resin exterior body tends to vary.

In the related art, the conductive adhesive layer is formed by using a conductive adhesive such as a paste containing silver particles. However, the paste containing silver particles is expensive, and the contact resistance may increase depending on the type of the cathode body. It is also conceivable to use conductive carbon (for example, carbon black) instead of the silver particles. General carbon black has a structure developed to some extent, but has a small average particle size of primary particles and a large specific surface area. In order to secure sufficient adhesive strength of the conductive adhesive layer and to suppress viscosity of the paste for forming the conductive adhesive layer to be low, since a large amount of binder is required, the conductivity of the conductive adhesive layer is reduced. On the other hand, when a proportion of the binder in the paste is decreased to increase a proportion of the conductive carbon, the viscosity of the paste is excessively increased to reduce coatability, and the adhesive strength is reduced even though the conductivity of the conductive adhesive layer can be improved. Thus, in the conductive adhesive layer containing conductive carbon, it is difficult to secure both high adhesive strength and high conductivity.

In view of the above circumstances, a carbon paste according to a first aspect of the present disclosure includes carbon particles (may referred to as first carbon particles) of which an average particle size of primary particles is from 40 nm to 100 nm, inclusive, in a proportion of from 25 vol % to 75 vol %, inclusive, in dried solid content. A solid electrolytic capacitor element according to a second aspect includes a carbon layer (may be referred to as a first carbon layer) disposed between the capacitor basic element and the cathode body and containing primary particles in a proportion of from 25 vol % to 75 vol %, inclusive. The first carbon particles have high conductivity, and have an average particle size of primary particles larger than an average particle size of general carbon black. Thus, when the carbon paste is used for adhesion between the capacitor basic element and the cathode body, sufficient adhesive strength can be secured even though the amount of the binder is small in the first carbon layer to be formed. Since first carbon layer can be highly filled with the first carbon particles, high conductivity of first carbon layer can be secured. In addition, since sufficient adhesive strength is obtained between the capacitor basic element and the cathode body, the contact resistance between the capacitor basic element and the cathode body can be suppressed to be low, and the stacking deviation between the capacitor basic element and the cathode body can be suppressed. Thus, the ESR of solid electrolytic capacitor can be suppressed to be low. In addition, high electrostatic capacity of solid electrolytic capacitor can be secured. By suppressing the stacking deviation, the entry of the air into the solid electrolytic capacitor element is reduced, and the deterioration of the solid electrolyte layer and the like can be suppressed. Thus, the reduction in the capacitor performance is suppressed, and the product lifespan can be improved. Due to the use of the carbon paste, since high conductivity and adhesive strength is obtained without using the paste containing expensive silver particles, it is advantageous in terms of cost.

Hereinafter, a carbon paste, a solid electrolytic capacitor, and a solid electrolytic capacitor element (hereinafter, may be simply referred to as a capacitor element) of the present disclosure will be described more specifically with reference to the drawings as necessary.

[Carbon Paste]

(First Carbon Particle)

An average particle size of primary particles of first carbon particles is from 40 nm to 100 nm, inclusive, and may be from 50 nm to 80 nm, inclusive. In contrast, an average particle size of carbon black used for a general conductive material is less than 40 nm. In addition, an average particle size of graphite particles used for constituent members of the solid electrolytic capacitor element is usually from 500 nm to 1 μm, inclusive.

By using the first carbon particles, as compared with a case where general carbon black is used, since high adhesive strength is obtained even with a small amount of binder, the carbon paste or first carbon layer can be highly filled with the first carbon particles. In addition, the average particle size of the first carbon particles is within the above range, and thus, viscosity can be suppressed to be low even though the carbon paste is highly filled with the first carbon particles. Further, the first carbon particles have a certain specific surface area, and thus, it is possible to obtain high adhesive strength while high conductivity in the first carbon layer is secured as compared with the case of the graphite particles.

In the present specification, the average particle size is a cumulative 50% particle size (median size) in a volume-based particle size distribution measured by using a particle size distribution measurement device of a dynamic light scattering method. As the particle size distribution measurement device by the dynamic light scattering method, for example, a light scattering photometer DLS-8000 manufactured by Otsuka Electronics Co., Ltd. is used.

Note that, in a case where the average particle size is determined for a carbonaceous material collected from the carbon paste, for example, a dispersion containing sample D obtained by the following procedure is used as a sample for measuring the average particle size. A predetermined amount of carbon paste is collected, an appropriate amount of water is added to a dried product (sample A) obtained by drying under a reduced pressure, and the obtained mixture (sample B) is centrifuged to be separated into a solid (sample C) and a liquid (liquid I). Solid sample C is washed with water, washed with an organic solvent, and dried to obtain a carbonaceous material (sample D). At this time, a liquid (liquid II) obtained by washing with water and washing with an organic solvent is separately recovered. A dispersion for measurement is prepared by dispersing sample D in a liquid dispersion medium by using a surfactant.

Further, in a case where the average particle size is determined for the carbonaceous material collected from the first carbon layer of the solid electrolytic capacitor element, for example, a dispersion containing sample H obtained by the following procedure is used as a sample for measuring the average particle size. First, a solid electrolytic capacitor is embedded in a curable resin to produce a sample in which the curable resin is cured. The first carbon layer on the capacitor element is exposed by performing polishing, milling, or the like on the sample. The exposed first carbon particles are scraped off to collect a predetermined amount of sample (sample E). Sample E is mixed with a nitric acid aqueous solution having a concentration of 1.0 mass %, and the mixture is allowed to stand at room temperature (from 20° C. to 35° C., inclusive) for 1 day. The resulting mixture (sample F) is separated into a solid (sample G) and a liquid (sample III) by centrifugation. Solid sample G is washed with water, washed with an organic solvent, and dried to obtain a carbonaceous material (sample H). At this time, a liquid (liquid IV) obtained by washing with water and washing with an organic solvent is separately recovered. A dispersion for measurement is prepared by dispersing sample H in a liquid dispersion medium by using a surfactant.

As the organic solvent for washing the solid sample C or G, for example, an organic solvent capable of dissolving a polymer component that cannot be removed by water washing may be selected from those exemplified as the organic solvent used for preparing the carbon paste to be described later. As the dispersion medium, for example, pure water or an organic medium which is liquid at room temperature (for example, 20° C. to 35° C.) is used. Each of the type and concentration of the surfactant, the type of the dispersion medium, and the concentration of sample D or sample H in the dispersion may be selected within a range in which a dispersion suitable for measuring the average particle size can be prepared.

A dibutyl phthalate (DBP) oil absorption amount of the first carbon particles is preferably less than or equal to 75 mL/100 g, and may be less than or equal to 60 mL/100 g. In a case where the DBP oil absorption amount of the first carbon particles is in such a range, even though the carbon paste or the first carbon layer is highly filled with the first carbon particles, higher adhesive strength is easily obtained. A lower limit value of the DBP oil absorption amount of the first carbon particles is not particularly limited, and is, for example, more than or equal to 55 mL/100 g. In the general carbon black, the DBP oil absorption amount is more than 80 mL/100 g. The DBP oil absorption amount can be measured by using sample D or sample H described above.

A BET specific surface area of the first carbon particles is preferably less than or equal to 42 m²/g, and may be less than or equal to 35 m²/g. In a case where the BET specific surface area is in such a range, higher adhesive strength is easily obtained even if the carbon paste or the first carbon layer is highly filled with the first carbon particles. A lower limit value of the BET specific surface area of the first carbon particles is not particularly limited, and is, for example, more than or equal to 23 m²/g. Note that, a BET specific surface area of the graphite particles is usually less than or equal to 10 m²/g. In the general carbon black, the BET specific surface area is more than 35 m²/g, and is usually more than or equal to 60 m²/g.

The BET specific surface area is a specific surface area obtained by using a Brunauer-Emmett-Teller equation (BET equation) by a gas adsorption method using nitrogen gas. The BET specific surface area can be measured by using sample D or sample H described above.

In the carbonaceous material, size Lc of a crystallite in a c-axis direction is a parameter representing crystallinity of a graphite structure. Although graphite has a structure in which hexagonal mesh layers including carbon atoms are regularly stacked, as Lc is larger, crystallinity is higher in a stacking direction of the hexagonal mesh layers, that is, the number of stacked layers in which the hexagonal mesh layers are regularly stacked is larger. Size Lc of the crystallite of the first carbon particles in the c-axis direction is preferably more than or equal to 1.5 nm, and may be more than or equal to 3 nm or more than or equal to 4 nm, or may be more than or equal to 5 nm. Size Lc of the crystallite of the first carbon particles in the c-axis direction is, for example, less than 100 nm, may be less than or equal to 50 nm or less than or equal to 10 nm, and may be less than 7 nm or less than or equal to 6 nm. In a case where Lc is in such a range, since high crystallinity of the first carbon particles can be secured, conductivity of first carbon layer can be further enhanced. The lower and upper limit values of Lc can be arbitrarily combined.

Note that, in general graphite particles, Lc is determined by a particle size after pulverization, and is about from 3 μm to 10 μm, inclusive, and Lc of the carbon black that is general conductive carbon is less than 1.5 nm, and is usually less than or equal to 1.3 nm. For example, Lc of Ketjenblack is 0.87 nm, Lc of acetylene black is 1.3 nm, and Lc of the carbonaceous material as a raw material of the first carbon particles is less than or equal to 1.2 nm.

Size Lc of the crystallite of the first carbon particles in the c-axis direction is obtained from an X-ray diffraction (XRD) profile of the first carbon particles by analysis using a Halder-Wagner equation. The XRD profile of the first carbon particles can be measured under the following conditions by using sample D or sample H described above. More specifically, first, a sample is set on a glass plate to have a uniform thickness, the sample is set in an XRD device, a beam emitted from an X-ray tube is incident on the sample, and a diffracted X-ray pattern is detected. Intensity data of the obtained X-ray pattern is analyzed by integrated powder X-ray analysis software using the Halder-Wagner equation to obtain Lc.

Measurement device: X-ray diffraction measurement device (model: RINT-TTR II) manufactured by Rigaku Corporation
    Counter cathode: Cu-Kα
    Tube voltage: 40 kV
    Tube current: 30 mA or more
    Measurement range (2θ): 10° to 90°
    Measurement interval: 0.04°/sec
    Analysis software: integrated powder X-ray analysis software (using Halder-Wagner method)
    Note that, Size Lc of the crystallite is obtained from the following Halder-Wagner equation.

$$\left(\frac{\beta}{\tan\theta}\right)^2 = \frac{\kappa\lambda}{D} \times \frac{\beta}{\tan\theta \cdot \sin\theta} + 16\varepsilon^2$$

In the equation, β is an integral breadth (a value obtained by subtracting contribution of spread of a diffraction line derived from the measurement device), θ is a Bragg angle, κ is a shape factor, λ is a wavelength, D is a crystallite size, and ε is micro strain.

A proportion of the first carbon particles in a dried solid content in the carbon paste is more than or equal to 25 vol %, and is preferably more than or equal to 35 vol % or more than or equal to 45 vol %, and may be more than or equal to 50 vol % from the viewpoint of securing higher conductivity of the first carbon layer. The proportion of the first carbon particles in the dried solid content in the carbon paste is less than or equal to 75 vol %, and is preferably less than or equal to 70 vol % or less than or equal to 60 vol % from the viewpoint of securing higher adhesive strength between the capacitor basic element, the cathode body, and the first carbon layer. The lower and upper limit values can be arbitrarily combined.

In a case where the proportion of the first carbon particles is determined from the carbon paste, first, a mass of sample D described above is measured, and the type of the first carbon particles is identified from sample D by using a known analysis method. A volume of the first carbon particles is determined from a specific gravity of the identified first carbon particles obtained from the mass of sample D and values in the literature or the like. The binder is separated from liquid I and liquid II collected when sample C and sample D are obtained by a known separation method, and a mass of the binder is measured. The type of the binder is identified by using a known analysis method. The volume of the binder is determined from the specific gravity of the identified binder obtained from the literature value or the like and a measured value of the mass of the binder. A proportion (vol %) of the first carbon particles is obtained by dividing a volume of the first carbon particles by a total of a volume of the first carbon particles and a volume of a binder and converting the resulting value into a percentage. In a case where the proportion of the first carbon particles is obtained from the first carbon layer, the proportion (vol %) of the first carbon particles can be determined in the same manner as in the case of determining from the carbon paste, except that sample H is used instead of sample D and liquid III and liquid IV are used instead of liquid I and liquid II.

The first carbon particles are obtained, for example, by firing oil-furnace black at a high temperature. Since the oil-furnace black is inexpensive, in a case where the carbon paste containing the first carbon particles is used, the cost of solid electrolytic capacitor can be significantly reduced as compared with the case where the paste containing the silver is used. On the other hand, since the oil-furnace black has a larger average particle size than other carbon blacks, graphitization hardly proceeds in a production procedure. In addition, since the oil-furnace black contains a large amount of impurities such as an alkali metal, an alkaline earth metal, and a sulfur component, in a case where the oil-furnace black is used for the solid electrolytic capacitor, reliability is easily reduced. Thus, the first carbon particles are obtained, for example, by firing the oil-furnace black at a high temperature (for example, 1800° C. or higher) in an activated gas atmosphere. As a result, a content of impurities is reduced, graphitization proceeds, and the first carbon particles having high conductivity are obtained. Examples of the activated gas include hydrogen gas. The firing temperature is, for example, more than or equal to 1800° C. and less than or equal to 2500° C. On the other hand, the acetylene black or Ketjenblack has a relatively high degree of graphitization among carbon blacks, and the conductivity of the particles themselves is high. However, since these carbons have a small average particle size of primary particles and a large specific surface area, a large amount of binder is required, and it is difficult to secure the high conductivity of the conductive adhesive layer formed by using these carbons.

The carbon paste usually contains the binder and the organic solvent in addition to the first carbon particles. The carbon paste may contain an additive agent as necessary. The additive agent is not particularly limited, and examples thereof include known additive agents to be used for the carbon paste. The carbon paste may contain water as necessary.

The binder is not particularly limited, and examples thereof include organic polymers. The organic polymer may be either a curable resin or a thermoplastic resin. In addition, the curable resin and the thermoplastic resin may be mixed and used. The curable resin may be a thermosetting resin. A curable resin composition containing a curable resin and at least one selected from the group consisting of a polymerization initiator, a curing agent, a curing accelerator, and a curing catalyst may be used as the hinder.

Examples of the organic polymer include an epoxy resin, an acrylic resin, a polyimide resin, a polyamide resin, a polyurethane resin, a polyester resin, a fluororesin, a polyurethane resin, a vinyl resin, a polyolefin resin, a phenoxy resin, and a rubber-like material. One type of precursor may be used, or two or more types thereof may be used in combination. A bisphenol F type epoxy resin, a bisphenol A type epoxy resin, or a mixture thereof can be used as the epoxy resin. In addition, the epoxy resin may contain a polyfunctional epoxy resin. A tetraphenylolethane type resin can be used as the polyfunctional epoxy resin.

In particular, the viscosity of the binder can be reduced by containing the polyester resin in the binder, and coatability of the carbon paste can be improved. A number-average molecular weight (Mn) of the polyester resin is preferably from 10,000 to 25,000, inclusive. The viscosity of the binder can be appropriately lowered by setting the number-average molecular weight of the polyester resin within the above range. Note that, a plurality of polyester resins having different number-average molecular weights may be mixed and used. In addition, in a case where the polyester resin is contained in the binder, a proportion of the polyester resin in the binder is preferably less than or equal to 60 mass %.

The organic solvent may be selected in consideration of volatility when the first carbon layer is formed, the type of the binder, and the like. The organic solvent is not particularly limited, and examples thereof include alcohols (including terpene alcohols), ketones, esters, ethers, amides, nitriles, sulfoxides, and hydrocarbons (including terpenes). Specifically, α-terpineol, cyclopentanone, ethyl carbitol, cyclohexanone, and the like can be used as the organic solvent. The carbon paste may contain one type of organic solvent or two or more types of organic solvents.

As described above, when the curable resin is contained in the binder, the curing agent may be further mixed. An imidazole-based curing agent such as 2-phenyl-4-methyl-hydroxymethylimidazole or 2-phenyl-4,5-dihydroxymethyl-imidazole can be used as the curing agent. In addition, a reaction start temperature of the curing agent is preferably from 130° C. to 155° C., inclusive, and is preferably higher than a volatilization temperature of the organic solvent. When the curable resin in the binder is cured and curing is started at a temperature lower than the volatilization temperature of the organic solvent, the amount of the organic solvent remaining without being volatilized in the binder after curing increases. Thus, when the solid electrolytic capacitor after completion is heated to a high temperature by a reflow process or the like, the remaining organic solvent volatilizes, and cracks are caused in the conductive adhesive layer and the exterior body formed by the carbon paste. Thus, there is a possibility that reliability is reduced.

The carbon paste can be obtained by mixing constituent components. The mixing can be performed by a known method, for example, a method using a mixer, a kneader, a homogenizer, or the like. In the preparation of the carbon paste, a defoaming treatment may be performed as necessary.

In the first carbon particles, since the average particle size of the primary particles is relatively large and a structure is developed, even though the first carbon particles are used at a high volume proportion, the viscosity of the carbon paste can be reduced as compared with the case of using the general carbon black. The viscosity of the carbon paste at 25° C. is, for example, less than or equal to 400 Pa·s, preferably less than or equal to 350 Pa·s. The viscosity of the carbon paste can be measured under the condition of a rotation speed of 10 rpm by using a B type viscometer.

[Solid Electrolytic Capacitor]

(Solid Electrolytic Capacitor Element)

The solid electrolytic capacitor includes a capacitor basic element, a cathode body, and a first carbon layer disposed between the capacitor basic element and the cathode body.

(First Carbon Layer)

First carbon layer contains the first carbon particles in a proportion of from 25 vol % to 75 vol %, inclusive. first carbon layer can be formed by applying the carbon paste to at least one surface of the capacitor basic element and the cathode body, stacking the other on a surface of a coating film of the carbon paste, and usually drying the carbon paste. The application of the carbon paste is not limited to a known application method (for example, an immersion method (dip coating method) or a spray coating method), and can be performed by a printing method, a combination thereof, or the like. The constituent components of first carbon layer can be referred to the description of the carbon paste.

A thickness of the first carbon layer may be, for example, from 1 μm to 10 μm, inclusive, or may be from 5 μm to 10 μm, inclusive.

(Capacitor Basic Element)

The capacitor basic element includes an anode body, a dielectric layer formed on a surface of the anode body, and a solid electrolyte layer covering at least a part of the dielectric layer. The capacitor basic element may further include a second carbon layer disposed between the solid electrolyte layer and the first carbon layer.

(Anode Body)

The anode body may include a valve metal, an alloy containing the valve metal, a compound containing the valve metal, or the like. These materials can be used singly or in combination of two or more types thereof. As the valve metal, for example, aluminum, tantalum, niobium, and titanium are preferably used. The anode body having a porous surface is obtained, for example, by roughening a surface of a base material (such as a foil-shaped or plate-shaped base material) containing the valve metal by etching or the like. The roughening can be performed by, for example, an etching treatment or the like. In addition, the anode body may be a molded body of particles that contain the valve metal or a sintered body of the molded body. Note that, the molded body and the sintered body have a porous structure as a whole.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. It is sufficient that the dielectric layer is formed so as to cover at least a part of the anode body. The dielectric layer is normally disposed on the surface of the anode body. Since the dielectric layer is formed on the porous surface of the anode body, the dielectric layer is formed along an inner wall surface of a pit of the anode body.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that, the dielectric layer is not limited thereto, and only has to be any one that functions as a dielectric material.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode part in the solid electrolytic capacitor.

The solid electrolyte layer contains a conductive polymer. The solid electrolyte layer may further contain at least one of a dopant and an additive agent as necessary.

As the conductive polymer, a known polymer used for a solid electrolytic capacitor, such as a π-conjugated conductive polymer, may be used. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, a polymer that adopts polypyrrole, polythiophene, or polyaniline as a basic skeleton is preferable. The above-mentioned polymers also include a homopolymer, a copolymer of two or more types of monomers, and derivatives of these polymers (a substitute having a substituent group). For example, polythiophene includes poly(3,4-ethylenedioxythiophene) and the like.

As the conductive polymer, one type may be used alone, or two or more types may be used in combination.

The solid electrolyte layer can further contain a dopant. As the dopant, at least one selected from the group consisting of anions and polyanions is used, for example.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid and naphthalenesulfonic acid.

As polyanion, for example, a polymer-type polysulfonic acid, and a polymer-type polycarboxylic acid and the like can be named. Examples of the polymer-type polysulfonic acid include a polyvinylsulfonic acid, a polystyrenesulfonic acid, a polyallylsulfonic acid, a polyacrylsulfonic acid, and a polymethacrylsulfonic acid. Examples of the polymer-type polycarboxylic acid include a polyacrylic acid and a polymethacrylic acid. The polyanion also includes a polyester sulfonic acid and a phenolsulfonic acid novolak resin. However, the polyanion is not limited thereto.

The dopant may be contained in the solid electrolyte layer in a free form, in an anion form, or in a salt form, and may be contained in a form that the dopant is bonded to the conductive polymer or interacts with the conductive polymer.

The content ratio of the dopant in the solid electrolyte layer may be, for example, from 10 parts by mass to 1000 parts by mass, inclusive, or may be from 20 parts by mass to 500 parts by mass, inclusive, or from 50 parts by mass to 200 parts by mass, inclusive with respect to 100 parts by mass of the conductive polymer.

The solid electrolyte layer may be a single layer or may be formed of a plurality of layers. When the solid electrolyte layer is formed of the plurality of layers, the conductive polymers contained in the layers may be the same or different. Meanwhile, the dopants included in the layers may be the same or different.

The solid electrolyte layer may further contain a known additive agent and a known conductive material other than the conductive polymer component as necessary. Examples of such a conductive material include at least one selected from the group consisting of conductive inorganic materials such as manganese dioxide and TCNQ complex salts.

Note that, a layer for improving adhesiveness may be interposed between the dielectric layer and the solid electrolyte layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. Examples of the precursor of the conductive polymer include monomers, oligomers, prepolymers or the like. The solid electrolyte layer may be formed by attaching a treatment liquid (for example, a dispersion liquid or solution) containing a conductive polymer to the dielectric layer, and then drying the treatment liquid. Examples of the dispersion medium (or solvent) include water, an organic solvent, and a mixture thereof. The treatment liquid may further contain other components (at least one selected from the group consisting of a dopant and an additive agent, and the like).

When the treatment liquid containing the precursor of the conductive polymer is used, an oxidizing agent is used to polymerize the precursor. The oxidizing agent may be contained in the treatment liquid as an additive agent. Meanwhile, the oxidizing agent may be applied to the anode body before or after the treatment liquid is brought into contact with the anode body on which the dielectric layer is formed. Examples of such an oxidizing agent include a sulfate, a sulfonic acid, and a salt thereof. The oxidizing agent may be used singly or in combination of two or more types thereof.

A step of forming the solid electrolyte layer by immersion in the treatment liquid and polymerization (or drying) may be performed once, or may be repeated a plurality of times. In each time, conditions such as the composition and viscosity of the treatment liquid may be the same, or at least one condition may be changed.

(Second Carbon Layer)

The second carbon layer contains carbon particles (referred to as second carbon particles). The second carbon particles and the first carbon particles can be distinguished from each other by the average particle size of the primary particles. The average particle size of the primary particles of the second carbon particles is usually more than 100 nm and may be more than or equal to 500 nm. The average particle size of the military particles of the second carbon particles is, for example, less than or equal to 1 μm. The average particle size of the second carbon particles can be determined according to the case of the first carbon particles.

Examples of the second carbon particles include graphite (artificial graphite, natural graphite, and the like).

The second carbon layer usually contains a binder in addition to the second carbon particles. The second carbon layer may further contain an additive agent as necessary. Examples of the binder include organic polymers (in addition to the organic polymer exemplified as the binder of the carbon paste, a cellulose-based resin (cellulose ethers such as carboxymethyl-cellulose or salts thereof, cellulose esters, and the like) or the like). As the organic polymer, either a hydrophilic organic polymer or a hydrophobic organic polymer may be used, and these organic polymers may be used in combination. The binder may contain one type of organic polymer or two or more types of organic polymers. The binder may be either a curable resin (or a curable resin composition) or a thermoplastic resin.

A proportion of the second carbon particles in the second carbon layer is, for example, more than 70 vol % and more than or equal to 71 vol. %, and may be more than 71 vol % or more than or equal to 80 vol %. The proportion of the second carbon particles in the second carbon layer is, for example, less than or equal to 95 vol %, The proportion of the second carbon particles in the second carbon layer can be determined according to the proportion of the first carbon particles.

A thickness of the second carbon layer may be from 0.1 μm to 100 μm, inclusive, or may be from 0.5 μm to 50 μm, inclusive.

The second carbon layer is formed by, for example, applying a dispersion containing constituent components of the second carbon layer and a liquid medium to cover at least a part of the surface of the solid electrolyte layer and drying the dispersion. The dispersion is generally prepared by mixing constituent components of the second carbon layer and a liquid medium. The liquid medium is selected in accordance with the type of the binder and the like, and may be either water or an organic liquid medium. The organic liquid medium may be selected from the organic solvents exemplified for the carbon paste.

(Metal Particle-Containing Layer)

The capacitor basic element may contain a metal particle-containing layer disposed between the first carbon layer and the second carbon layer as necessary, but the metal particle-containing layer is not necessarily required.

The metal particle-containing layer can be formed, for example, by stacking a composition containing metal particles on a surface of the second carbon layer. Examples of the metal particle-containing layer include a metal-paste layer formed by using a composition containing metal powder such as silver particles and a binder (organic polymer or the like). A thermoplastic resin can be used as the binder, but a curable resin (thermosetting resin or the like) such as a polyimide resin or an epoxy resin is preferably used.

(Cathode Body)

The cathode body includes, for example, at least a metal foil. The type of metal constituting the metal foil is not particularly limited, and examples thereof include aluminum, an aluminum alloy, copper, and a copper alloy. A valve metal such as aluminum, tantalum, or niobium, or an alloy containing a valve metal may be used as the metal foil.

It is preferable that the first carbon layer is in contact with the cathode body. The first carbon layer is fixed by being in contact with the cathode body, and thus, the capacitor basic element can be reliably fixed to the cathode body. Meanwhile, it is preferable that the metal particle-containing layer is not interposed between the capacitor basic element and the cathode body. For example, even in a case where the capacitor basic element includes the metal panicle-containing layer on the surface thereof, the production cost can be reduced by not interposing another metal particle-containing layer (for example, a silver paste layer) between the capacitor basic element and the cathode body.

A surface of the metal foil may be porous as necessary. The metal foil having the porous surface is obtained by roughening (for example, etching) the metal foil. An anodization coating film may be provided on the surface of the metal foil.

The cathode body may include the metal foil and a surface layer formed on the surface of the metal foil. In this case, the capacitor element is in contact with the surface layer of the metal foil and the first carbon layer. The surface layer contains, for example, a material different from the metal foil (metals, metal compounds, non-metals, or the like). Examples of such a material include a conductive material. Examples of the conductive material constituting the surface layer include a metal (titanium, nickel, or the like), a metal compound (nitrides, carbides, carbonitrides, oxides, and the like) such as a titanium compound, and a carbonaceous material. The surface layer may contain one type or two or more types of these materials.

It is preferable that the surface layer is formed by a gas phase method, a firing method, or the like. This is because high conductivity is obtained by directly fixing the conductive material to the metal foil. Examples of the gas phase method include vapor deposition (vacuum vapor deposition, electron beam vapor deposition, arc plasma vapor deposition, and the like), sputtering, and CVD. The surface layer may be formed on one surface or both surfaces of the metal foil. The surface layer may have a single-layer structure or a multilayer structure. In the surface layer of the multilayer structure, for example, at least one of a constituent component and a structure (density or the like) may be different in each layer.

A thickness of the anode body may be, for example, from 0.1 μm to 100 μm, inclusive, and from 1 μm to 50 μm, inclusive.

A thickness of the surface layer is, for example, from 0.5 μm to 10 μm, inclusive, and may be from 1 μm to 5 μm, inclusive, per one surface of the metal foil.

(Others)

The solid electrolytic capacitor may include a substrate that supports the solid electrolytic capacitor element as necessary. Examples of the substrate include an insulating substrate, a metal substrate, and a printed substrate.

The capacitor element is sealed by using the exterior body (resin exterior body) or a case. For example, a material resin (for example, uncured thermosetting resins and fillers) of the capacitor element and the exterior body may be housed in a mold, and the capacitor element may be sealed with the resin exterior body by a transfer molding method, a compression molding method, or the like.

The solid electrolytic capacitor may be a wound type, or may be either a chip type or a stacked type. The solid electrolytic capacitor may include at least one capacitor element, and may include a stacked body of two or more capacitor elements. The configuration of the capacitor element may be selected in accordance with the type of the solid electrolytic capacitor.

When at least one of the capacitor elements included in the solid electrolytic capacitor includes first carbon layer containing the first carbon particles in a proportion of from 25 vol % to 75 vol %, inclusive, an effect of improving conductivity by the first carbon layer is obtained. In 50% or more (more preferably 75% or more) of the number of capacitor elements included in the solid electrolytic capacitor, it is preferable that the capacitor element includes the first carbon layer, and it is more preferable that all the capacitor elements include the first carbon layer, from the viewpoint of enhancing an effect of reducing the stacking deviation and easily obtaining the effect improving conductivity in the whole solid electrolytic capacitor.

Further, a volatile component (residual organic volatile component) of an organic material remaining in the solid electrolytic capacitor is preferably less than or equal to 2000 μg/g per mass of the solid electrolytic capacitor. The residual organic volatile component of the solid electrolytic capacitor is considered to be an organic solvent mainly contained in the carbon paste or the like. When the organic solvent remaining in the solid electrolytic capacitor volatilizes at a high temperature in a reflow process or the like, cracks are caused in the conductive adhesive layer and the exterior body. Thus, there is a possibility that reliability is reduced.

The residual organic volatile component can be analyzed by inserting a sample (solid electrolytic capacitor) in a stainless steel tube and performing Thermal Desorption-Gas Chromatograph/Mass spectrometry (TD-GC/MS) measurement. Specifically, components volatilized from the sample are detected under the following device and measurement conditions, and a detection amount thereof is measured.

Measurement device: TurboMatrixATD/Clarus SQ8T/ Clarus680 (manufactured by PerkinElmer)

Column: SPB-5 (60 m×0.25 mm×0.25 μm)

Column temperature raising condition: 35° C.·5 min to (10° C./min) to 100° C. to (20° C./min) to 290° C.·1 min Sample heating condition: 260° C.·1 min Carrier gas: helium (1 mL/min)

Injection amount: 0.2%

Measurement mode: scan (m/z=24 to 500)

Alternatively, a method for measuring a weight loss amount due to the residual volatile components (all the residual volatile components including the residual organic volatile components) can also be used as a method for evaluating a residual volatile component amount in the solid electrolytic capacitor. The weight loss amount by the residual volatile components is preferably less than or equal to 1.0 wt %. The weight loss amount due to the residual volatile components can be analyzed by cutting a sample (solid electrolytic capacitor) with a pencil and performing Thermogravimetry-Differential Thermal Analysis (TG-DTA) measurement. Specifically, components volatilized from the sample are detected under the following device and measurement conditions, and a detection amount thereof is measured.

Measurement device: TA6000 (manufactured by Hitachi High-Tech Corporation)

Baking treatment: 85° C. 12 h (under N₂ atmosphere)

Measurement profile: 25° C. to 300° C.

Temperature raising condition: 10° C./min

Carrier gas: under N₂ atmosphere

In the solid electrolytic capacitor, a current may be drawn from the capacitor element by using a lead such as a lead frame. More specifically, one end of an anode lead is electrically connected to the anode body, and the other end of the anode lead is drawn outward from the exterior body or the case. Similarly, one end of a cathode lead is electrically connected to the cathode body, and the other end of the cathode lead is drawn outward from the exterior body or the case. The other end of each lead exposed from the exterior body or the case is used for, for example, solder connection to a substrate on which the solid electrolytic capacitor is to be mounted. The lead may be connected to the anode body or the cathode body by welding or the like, or the conductive adhesive may be used. The carbon paste may be used as the conductive adhesive. The lead can be made of, for example, a metal such as copper or a copper alloy.

The solid electrolytic capacitor may include an external electrode. The external electrode on the anode side may be referred to as a first external electrode, and the external electrode on the cathode side may be referred to as a second external electrode. Each of the anode body and the cathode body may be connected to the external electrode by using the lead. Meanwhile, the ends of the anode body and the cathode body may be exposed from the exterior body or the case, and the exposed ends may be electrically connected to the external electrode. The exposed ends of the anode body and the cathode body may be connected to the external electrode by, for example, at least one selected from the group consisting of joint, a plating method, a vapor phase method, a cold spraying method, a firing method, and a spraying method. The exposed ends of the anode body and the cathode body may be connected to the external electrode with a conductive contact layer interposed therebetween. An intermediate electrode layer covering the exposed ends of the anode body and the cathode body and the contact layer as necessary may be provided between the external electrode and the exterior body or the case.

In the solid electrolytic capacitor including the stacked body, the ends of the anode body and the cathode body of each capacitor element may be exposed from the exterior body and electrically connected to the external electrode, and the current may be drawn from the ends of the anode body and the cathode body. In this case, the ends of the anode body of each capacitor element may be exposed to one principal surface of the exterior body, or may be exposed to two or more principal surfaces. Similarly, the ends of the cathode body of each capacitor element may be exposed to one principal surface of the exterior body, or may be exposed to two or more principal surfaces. From the viewpoint of suppressing short circuit, it is preferable that the ends of the cathode body and the ends of the anode body are usually exposed to different principal surfaces.

For example, the anode body has a pair of ends (referred to as first ends) facing each other, and the cathode body has a pair of ends (referred to as second ends) facing each other. The exterior body includes a first principal surface, a second principal surface opposite to the first principal surface, a third principal surface intersecting the first principal surface and the second principal surface, and a fourth principal surface opposite to the third principal surface. Note that, the fourth principal surface intersects the first principal surface and the second principal surface. At this time, one first end of the anode body may be exposed from the exterior body on the first principal surface to be electrically connected to the external electrode on the anode side (referred to as a first external electrode), and one second end of the cathode body may be exposed from the exterior body on any of the second principal surface to the fourth principal surface to be electrically connected to the external electrode on the cathode side (referred to as a second external electrode). Further, in a case where the other first end of the anode body is exposed on the second principal surface to be electrically connected to the first external electrode, it is preferable that the pair of second ends of the cathode body is not exposed from the exterior body on the second principal surface from the viewpoint of suppressing short circuit. A direction in which the pair of first ends of the anode body face each other is referred to as a first direction, and a direction in which the pair of second ends of the cathode body face each other is referred to as a second direction. At this time, the first direction and the second direction may be parallel or may intersect each other. For example, in a case where one second end of the cathode body is exposed from the exterior body on the second principal surface, the first direction and the second direction are parallel to each other. When one second end of the cathode body is exposed from the exterior body on the third principal surface or the fourth principal surface, the first direction and the second direction intersect each other.

FIG. 1 is a schematic cross-sectional view illustrating a solid electrolytic capacitor according to a first exemplary embodiment of the present disclosure. Solid electrolytic capacitor 1 includes capacitor element 2, substrate S that supports capacitor element 2, resin exterior body 3 that seals capacitor element 2, external electrode (first external electrode) 4a disposed at the anode side, and external electrode (second external electrode) 5a disposed at the cathode side. Resin exterior body 3 has a substantially rectangular parallelepiped outer shape, and solid electrolytic capacitor 1 also has a substantially rectangular parallelepiped outer shape.

Capacitor element 2 includes capacitor basic element E including anode body 6, cathode body 9 including a metal foil, and first carbon layer C1 that binds capacitor basic element E to cathode body 9. Capacitor basic element E includes anode body 6, dielectric layer 7 covering anode body 6, solid electrolyte layer 8 covering dielectric layer 7, and second carbon layer C2 covering solid electrolyte layer 8. Anode body 6 includes a pair of first ends e1 facing each other, and cathode body 9 includes a pair of second ends e2 facing each other. Further, anode body 6 includes a region facing cathode body 9, and a region not facing cathode body 9. In the region of anode body 6 not facing cathode body 9, insulating separation layer 13 is formed in a part adjacent to cathode body 9 so as to cover a surface of anode body 6 in a band shape. Insulating separation layer 13 restrict contact between cathode body 9 and anode body 6. Meanwhile, insulating separation layer 13 may not be provided. In a case where separation layer 13 is not provided, this part is filled with resin exterior body 3.

One of the pair of first ends e1 of anode body 6 is exposed from first principal surface m1 of resin exterior body 3 to be electrically connected to first external electrode 4a. Intermediate electrode layer 4b is provided between first external electrode 4a and first principal surface m1 of resin exterior body 3. Contact layer 4c is provided between intermediate electrode layer 4b and first end e1 of anode body 6 exposed from first principal surface m1. First end e1 of anode body 6 exposed from resin exterior body 3 is electrically connected to first external electrode 4a with contact layer 4c and intermediate electrode layer 4b interposed therebetween.

One of the pair of second ends e2 of cathode body 9 is exposed from second principal surface m2 opposite to first principal surface m1 of resin exterior body 3 to be electrically connected to second external electrode 5a. Intermediate electrode layer 5b is provided between second external electrode 5a and second principal surface m2 of the resin exterior body. Second end e2 of cathode body 9 exposed from resin exterior body 3 is electrically connected to second external electrode 5a via intermediate electrode layer 5b interposed therebetween. In the illustrated example, a first direction (length direction of anode body 6) in which the pair of first ends e1 of anode body 6 face each other and a second direction (length direction of cathode body 9) in which the pair of second ends e2 of cathode body 9 face each other are parallel to each other.

When the solid electrolytic capacitor includes a stacked body of a plurality of capacitor elements, focusing on two adjacent capacitor elements in the stacked body, it is preferable that one cathode body is interposed between the capacitor basic elements respectively included in the two adjacent capacitor elements. And the first carbon layer is disposed between the cathode body and each of the capacitor basic elements.

In a case where the solid electrolytic capacitor includes the stacked body of the plurality of capacitor elements, stacking deviation is likely to occur. By using the above described carbon paste, the stacking deviation can be reduced even in a case where the solid electrolytic capacitor includes the stacked body, and thus deterioration of capacitor performance such as an increase in ESR can be suppressed.

Figure 2:
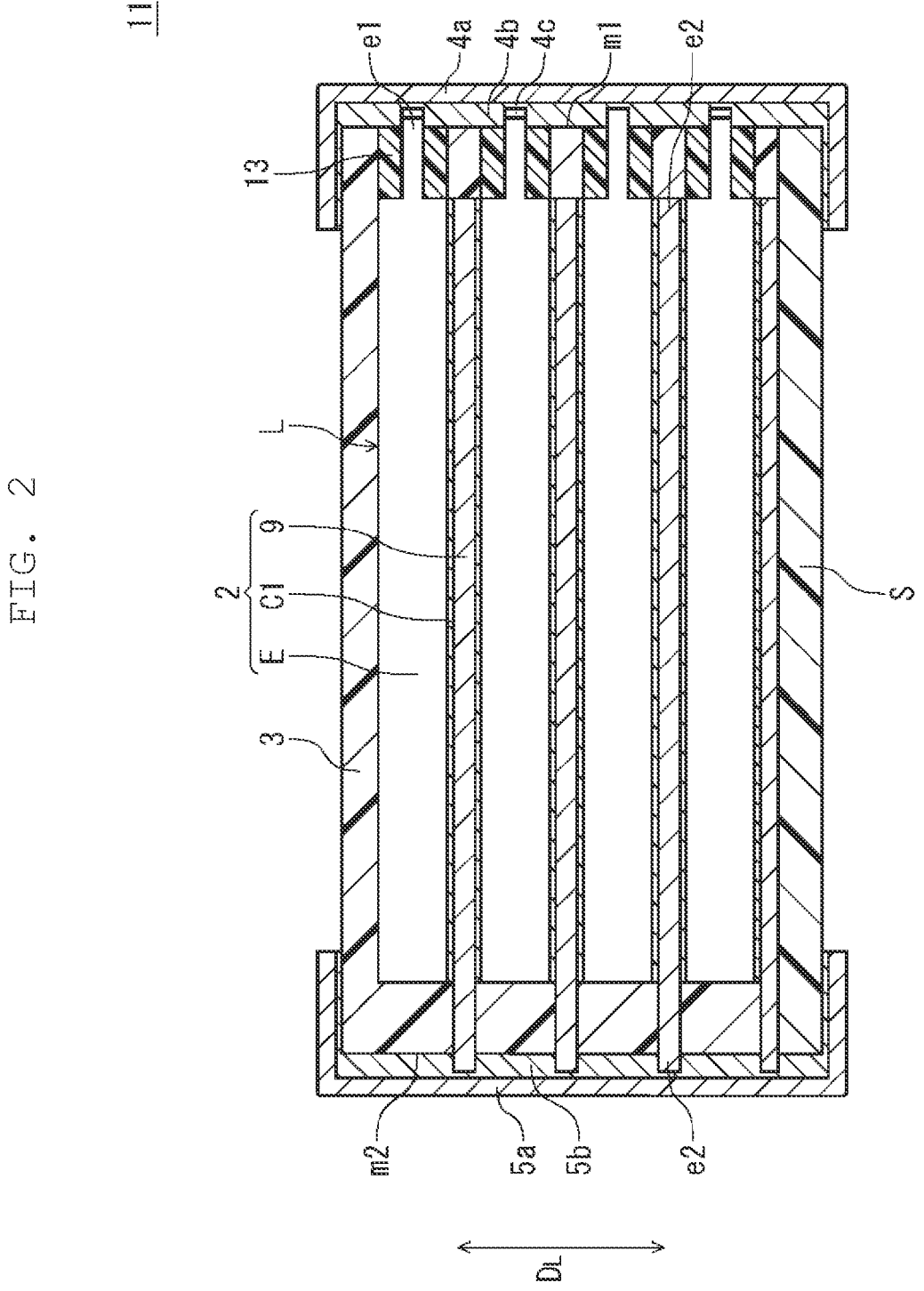
FIG. 2 is a schematic cross-sectional view illustrating a solid electrolytic capacitor according to a second exemplary embodiment of the present disclosure.

FIG. 2 is a schematic cross-sectional view illustrating a solid electrolytic capacitor according to a second exemplary embodiment of the present disclosure. Solid electrolytic capacitor 11 includes stacked body L including a plurality of capacitor elements 2, substrate S that supports stacked body L, resin exterior body 3 that seals stacked body L, first external electrode 4a, and second external electrode 5a. Stacked body L includes a plurality of stacked capacitor basic elements E and cathode body 9 including a metal foil disposed between adjacent capacitor basic elements F. First carbon layer C1 for binding capacitor basic element E and cathode body 9 is disposed between capacitor basic element E and cathode body 9. Note that, FIG. 2 is a schematic cross-sectional view illustrating solid electrolytic capacitor 11 taken along a plane parallel to a first direction in which a pair of first ends e1 of anode body 6 face each other and parallel to stacking direction $D_L$ of capacitor element 2. Other configurations of FIG. 2 can be referred to the description of FIG. 1.

In a case where the solid electrolytic capacitor includes the stacked body of the capacitor elements, a cathode body of the capacitor element positioned on an outermost side of the stacked body may be bound to a cathode lead (lead frame or the like) by using the carbon paste.

Figure 3:
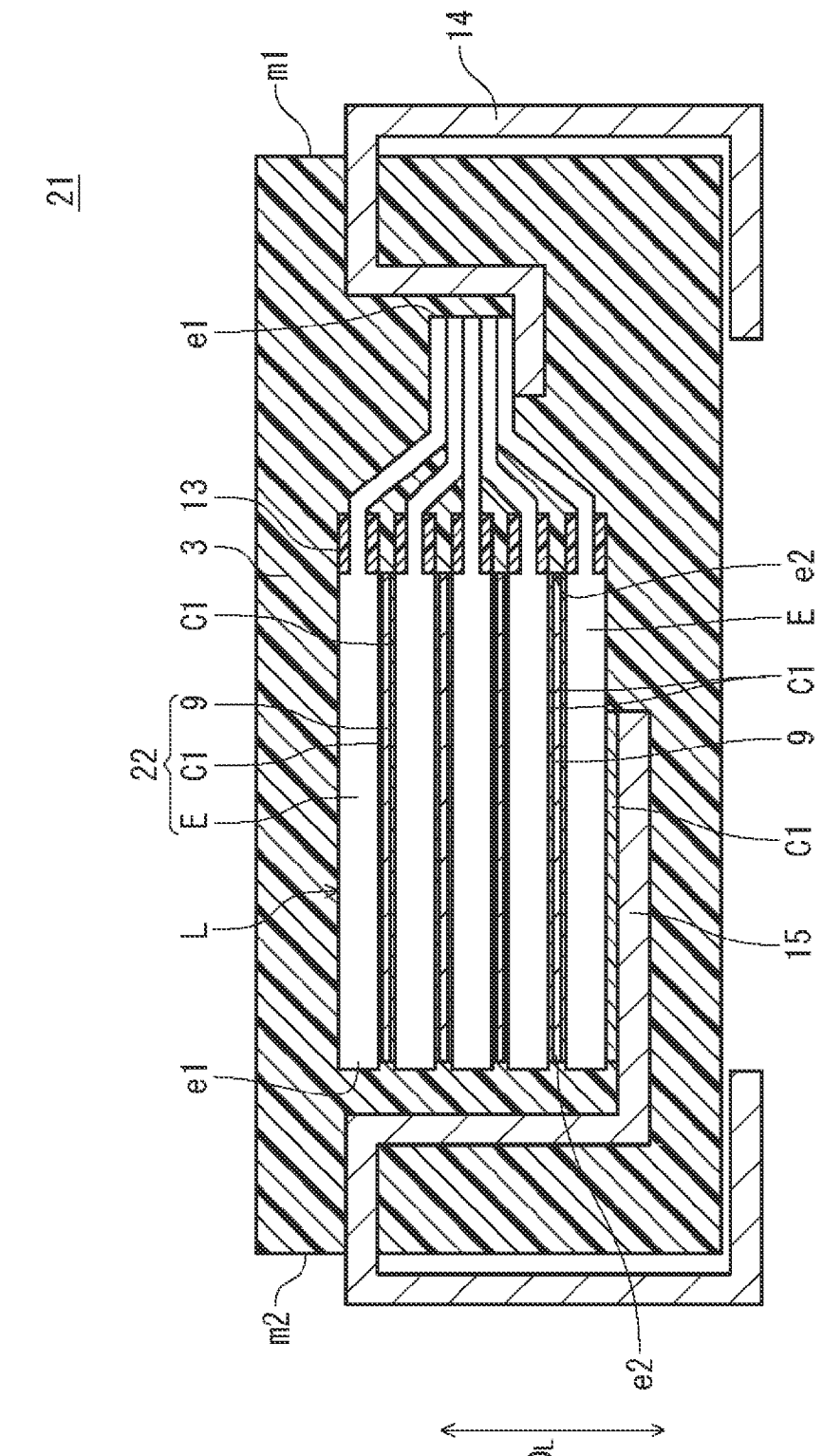
FIG. 3 is a schematic cross-sectional view illustrating a solid electrolytic capacitor according to a third exemplary embodiment of the present disclosure.

FIG. 3 is a schematic sectional view illustrating a solid electrolytic capacitor according to a third exemplary embodiment of the present disclosure. Solid electrolytic capacitor 21 includes stacked body L including a plurality of capacitor elements 22, resin exterior body 3 that seals stacked body L, and anode lead 14 and cathode lead 15 that are each at least partially exposed to an outside of resin exterior body 3. Note that, FIG. 3 is a schematic cross-sectional view illustrating solid electrolytic capacitor 21 taken along a plane parallel to a first direction in which a pair of first ends e1 of anode body 6 face each other and parallel to stacking direction $D_L$ of capacitor element 22.

In stacked body L, one first ends e1 of anode bodies 6 of capacitor basic elements E included in capacitor elements 22 in a bundled state are electrically connected to one end of anode lead 14 by welding. One end of cathode lead 15 is electrically connected to cathode body 9 with first carbon layer C1 formed by using the carbon paste interposed therebetween. A part of the other end side of anode lead 14 is drawn out from first principal surface m1 of resin exterior body 3. A part of the other end side of cathode lead 15 is drawn out from second principal surface m2 of resin exterior body 3. Other configurations of FIG. 3 can be referred to the description of FIGS. 1 and 2.

Note that, in FIGS. 2 and 3, a configuration of capacitor basic element E is omitted.

In a case where the solid electrolytic capacitor includes the stacked body of the plurality of capacitor elements, one first ends of the anode bodies of the capacitor elements may be alternately exposed from the first principal surface and the second principal surface of the exterior body or the case in the stacking direction of the stacked body to be electrically connected to the first external electrode.

Figure 4A:
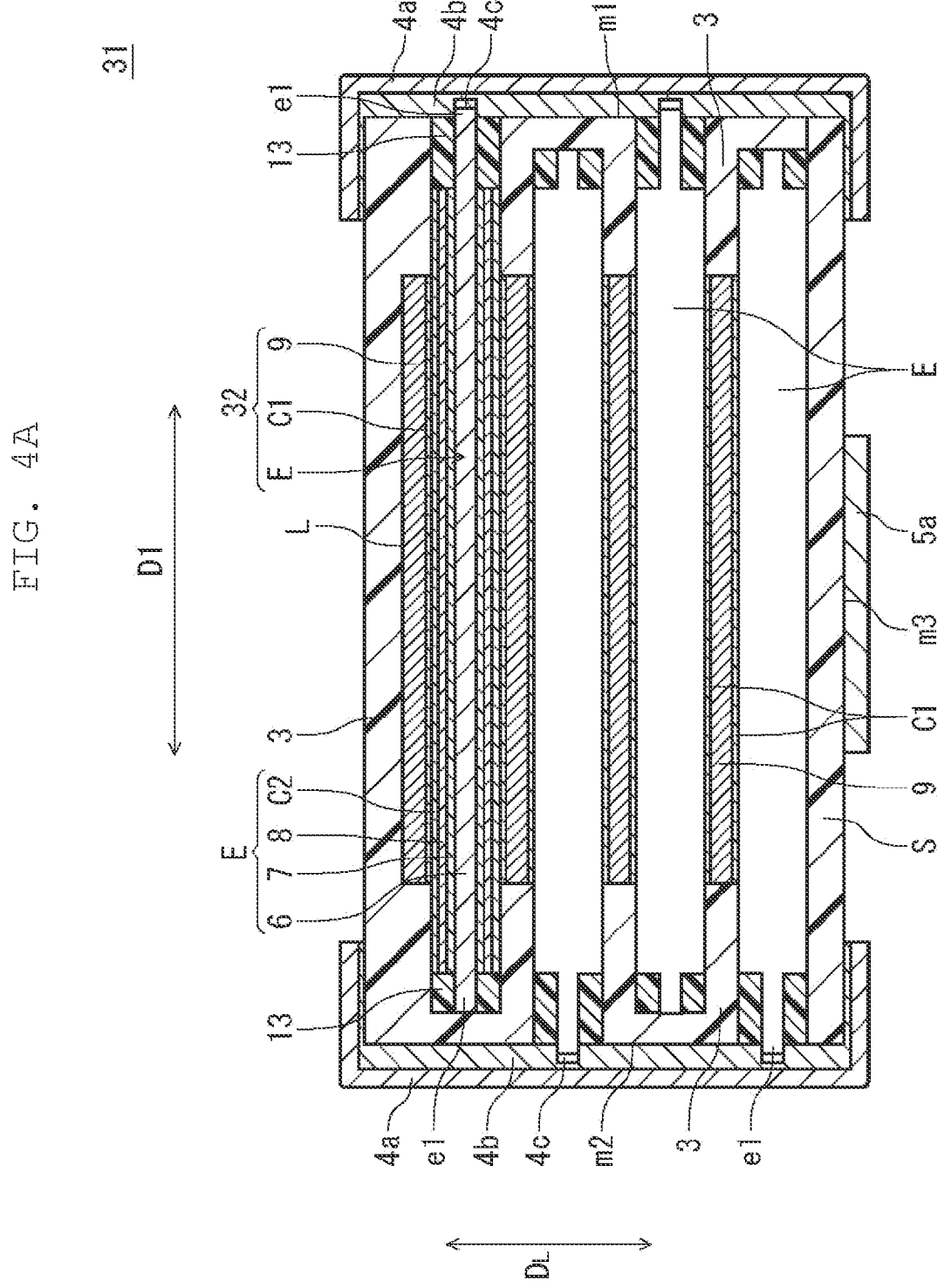
FIG. 4A is a schematic cross-sectional view illustrating a solid electrolytic capacitor according to a fourth exemplary embodiment of the present disclosure taken along a plane parallel to a length direction of an anode body and a stacking direction of solid electrolytic capacitor elements.
Figure 4B:
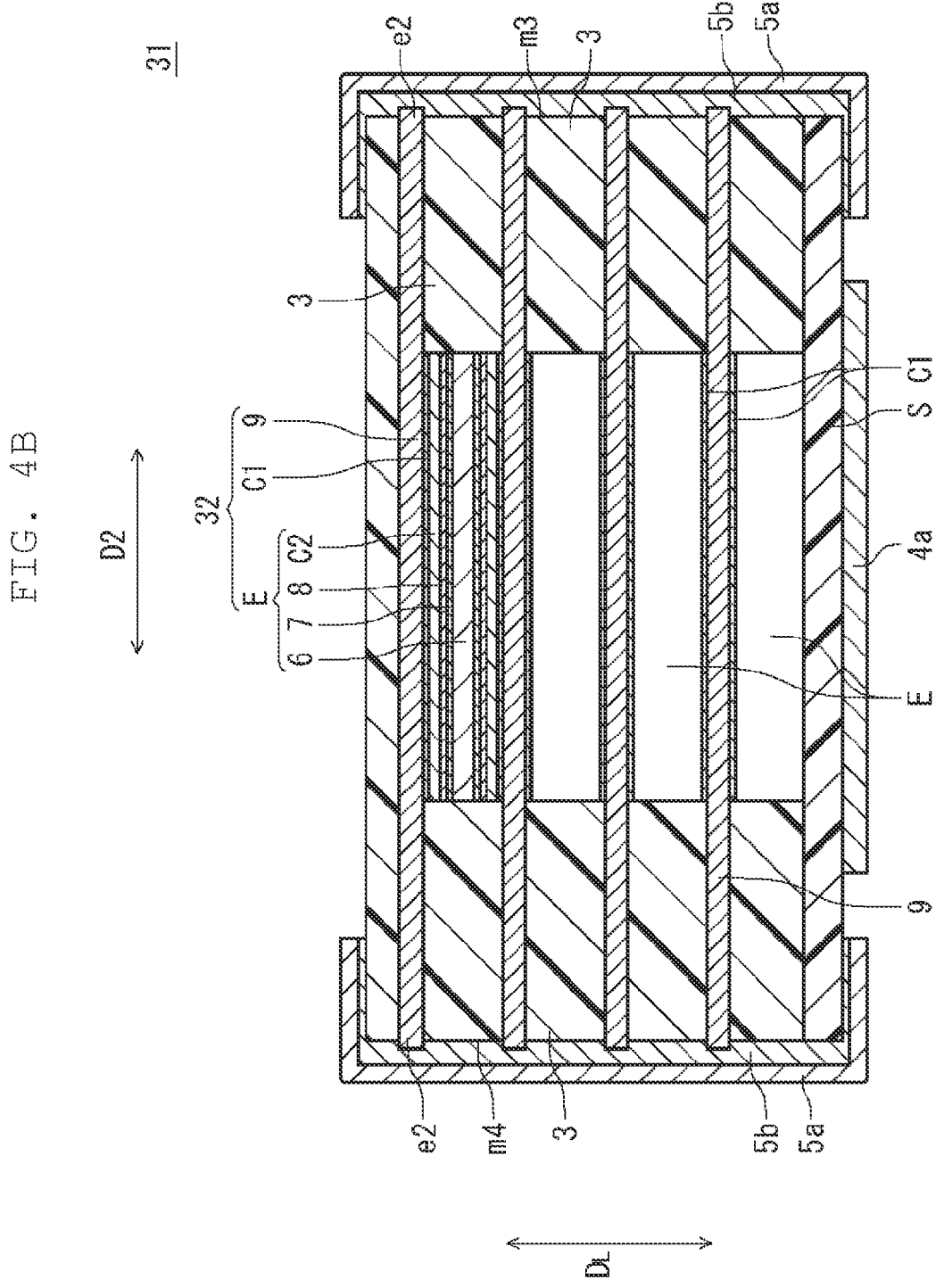
FIG. 4B is a schematic cross-sectional view illustrating the solid electrolytic capacitor according to the fourth exemplary embodiment taken along a plane parallel to a length direction of the cathode body and the stacking direction of the solid electrolytic capacitor elements.

FIG. 4A is a schematic cross-sectional view illustrating a solid electrolytic capacitor according to a fourth exemplary embodiment of the present disclosure taken along a plane parallel to first direction $D_1$ and stacking direction $D_L$. FIG. 4B is a schematic cross-sectional view illustrating the solid electrolytic capacitor according to the fourth exemplary embodiment taken along a plane parallel to second direction $D_2$ and stacking direction $D_L$.

Solid electrolytic capacitor 31 includes stacked body L including a plurality of capacitor elements 32, substrate S that supports stacked body L, resin exterior body 3 that seals stacked body L, first external electrode 4a, and second external electrode 5a. Stacked body L includes a plurality of stacked capacitor basic elements E and cathode body 9 including a metal foil disposed between adjacent capacitor basic elements E. First carbon layer C1 for binding capacitor basic element E and cathode body 9 is disposed between capacitor basic element E and cathode body 9.

Figure 4C:
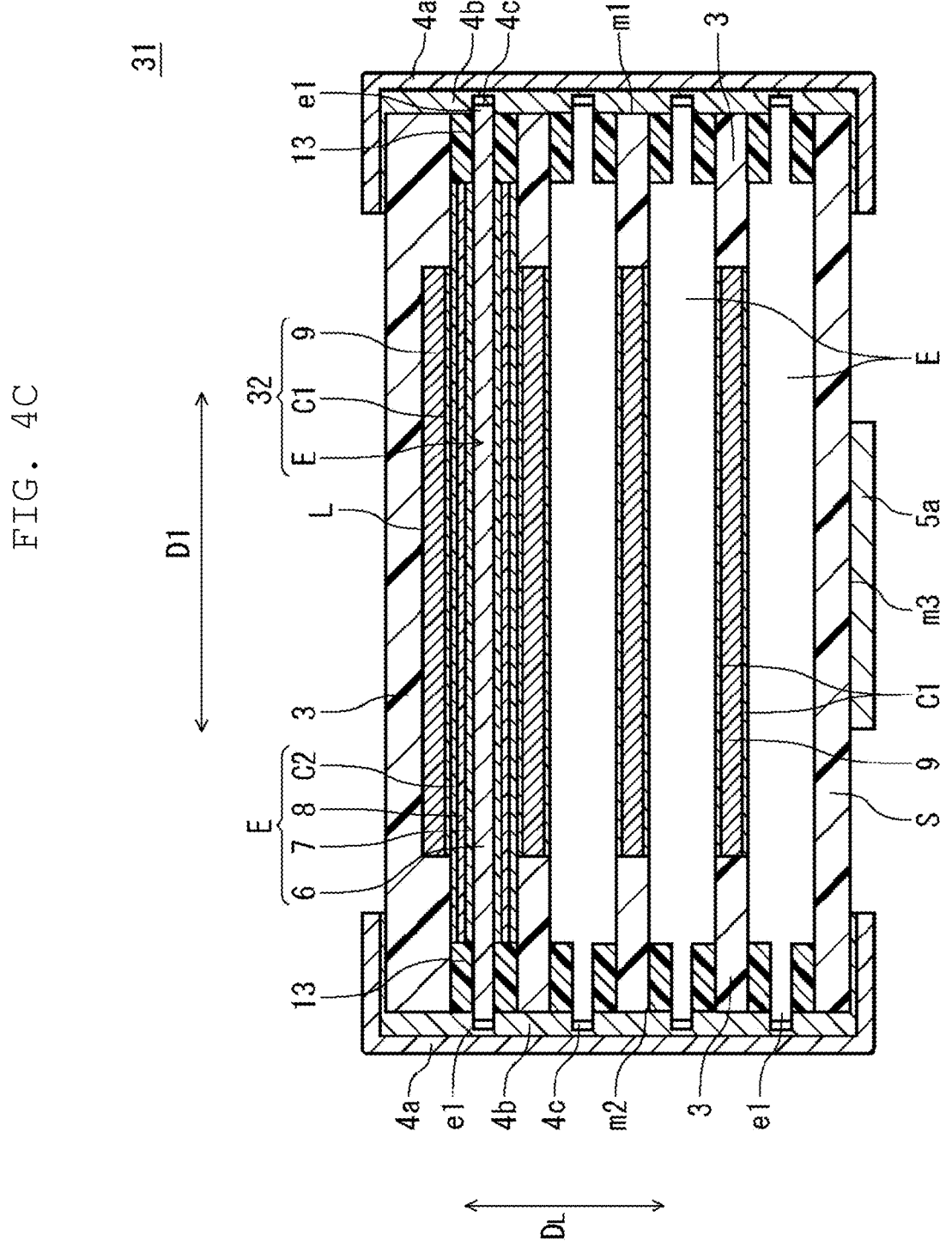
FIG. 4C is a schematic cross-sectional view illustrating a solid electrolytic capacitor according to a variation of the fourth exemplary embodiment of the present disclosure taken along a plane parallel to a length direction of an anode body and a stacking direction of solid electrolytic capacitor elements.

In anode bodies 6 of capacitor basic elements E, in stacking direction $D_L$, one first ends are alternately exposed from first principal surface m1 and second principal surface m2 opposite to first principal surface m1 of resin exterior body 3 to be electrically connected to first external electrode 4a. Further, in cathode bodies 9 of capacitor elements 32, one second ends e2 are exposed from third principal surface m3 of resin exterior body 3 to be electrically connected to second external electrode 5a. In addition, other second ends e2 are exposed from fourth principal surface m4 opposite to third principal surface m3 of the resin exterior body to be electrically connected to second external electrode 5a. In this case, first direction $D_1$ and second direction $D_2$ intersect each other. Other configurations of FIGS. 4A and 4B can be referred to the description of FIGS. 1 and 2. Note that, in FIGS. 4A and 4B, a configuration of a part of capacitor basic element E is omitted. Meanwhile, as shown in FIG. 4C, each of anode bodies 6 of capacitor basic elements E may have a configuration that one first end is exposed from first principal surface m1 of resin exterior body 3 to be electrically connected to first external electrode 4a, and the other first end is exposed from second principal surface m2 of resin exterior body 3 to be electrically connected to first external electrode 4a.

EXAMPLES

Hereinafter, the present disclosure will be specifically described based on Example and Comparative Examples. The present disclosure is not limited to the following Examples.

<<Solid Electrolytic Capacitors EA1 to EA8>>

Solid electrolytic capacitor 1 (solid electrolytic capacitors EA1 to EA8) illustrated in FIG. 1 was produced in the following manner, and characteristics thereof were evaluated.

(1) Preparation of Anode Body 6

Both surfaces of an aluminum foil (thickness: 100 μm) as a base material were roughened by etching to produce anode body 6.

(2) Formation of Dielectric Layer 7

A part of anode body 6 at the other end side was immersed in an anodizing solution, and a DC voltage of 10 V was applied for 20 minutes to form dielectric layer 7 containing aluminum oxide.

(3) Formation of Solid Electrolyte Layer 8

An aqueous solution containing a pyrrole monomer and p-toluenesulfonic acid was prepared. A monomer concentration in this aqueous solution was 0.5 mol/L, and a concentration of p-toluenesulfonic acid was 0.3 mol/L.

Anode body 6 on which dielectric layer 7 was formed in the above step (2) and a counter electrode were immersed in the obtained aqueous solution, and electrolytic polymerization was performed at a polymerization voltage of 3 V (polymerization potential with respect to a silver reference electrode) at 25° C. to form solid electrolyte layer 8.

(4) Formation of Second Carbon Layer C2

Graphite particles as second carbon particles and a dispersion material (cellulose derivative or the like) were wet-pulverized together with water to prepare a liquid dispersion. A volume ratio (graphite particles:dispersion material) between the graphite particles and the dispersion material was 50:20. An average particle size of primary particles of the second carbon particles obtained by the procedure described above was 0.7 μm.

Anode body 6 on which solid electrolyte layer 8 obtained in the above step (3) was formed was immersed in the liquid dispersion, taken out from the dispersion, and then dried to form second carbon layer C2 on the surface of solid electrolyte layer 8. Drying was carried out at a temperature ranging from 150° C. to 200° C. for 10 minutes to 30 minutes. A thickness of second carbon layer C2 was 0.5 μm. In this way, a total of 20 capacitor basic elements F were formed.

(5) Formation of Capacitor Element 2

(a) Preparation of Carbon Paste

Graphitized carbon obtained by firing carbon particles (average particle size of primary particles: 65 nm, Lc=1.15 nm) at 2500° C. for 9 hours in a gas atmosphere was used as first carbon particles. The primary particles of the first carbon particles obtained by the procedure described above had an average particle size of 65 nm, Lc of 5.2 nm, a DBP oil absorption amount of 60 mL/100 g, and a BET specific surface area of 27 m$^2$/g.

First carbon particles, an epoxy resin (bisphenol F type epoxy resin and imidazole-based curing agent) as a binder, and α-terpineol as an organic solvent were stirred with a kneading defoamer, and further kneaded with three rolls to prepare a carbon paste. Viscosity of the carbon paste at 25° C. obtained by the procedure described above was 330 Pa·s.

(b) Binding Between Capacitor Basic Element E and Cathode Body 9

A carbon paste was applied to the surfaces of second carbon layers C2 or cathode bodies 9 such that a coating film of the carbon paste was interposed between second carbon layers C2 and metal foils shown in Table 1 as cathode bodies 9, and capacitor basic elements E and cathode bodies 9 were alternately stacked. At this time, in a case where a metal foil having a surface layer was used, the metal foils were stacked such that the surface layers were in contact with the carbon paste. Subsequently, the binder in the carbon paste coating film was cured to produce a capacitor element. The binder was cured by heating at 150° C. to 200° C. for 10 to 60 minutes. Further, the volume proportion of the first carbon particles in first carbon layer C1 (or a dried solid content in the carbon paste) was set, to a value shown in Table 1.

Note that, the following metal foils were used as cathode body 9.

(c1) C-fired Al foil: aluminum foil including surface layer of fired carbonaceous material (thickness of surface layer: 3 μm, thickness of aluminum foil: 20 μm)

(c2) Ti-coated Al foil: aluminum foil including surface layer containing titanium metal (thickness of surface layer: 3 μm, thickness of aluminum foil: 20 μm)

(c3) Ni-vapor-deposited Al foil: aluminum foil having surface on which nickel metal is vapor-deposited (thickness of surface layer: 3 μm, thickness of aluminum foil: 20 μm)

(c4) C-vapor-deposited Al foil: aluminum foil having carbonaceous material vapor-deposited on surface thereof (thickness of surface layer: 3 μm, thickness of aluminum foil: 20 μm)

(c5) Cu foil: thickness of copper foil: 20 μm (c6) Al foil: thickness of aluminum foil: 20 μm (6) Assembly of Solid Electrolytic Capacitor 11

One first end e1 of anode body 6 and one second end e2 of cathode body 9 of each capacitor element 2 of stacked body L obtained in the above step (5) were molded in a state of being drawn out, and resin exterior body 3 made of an insulating resin was formed around capacitor element 2. At this time, one first end e1 of anode body 6 and one second end e2 of cathode body 9 were drawn out from first principal surface m1 of resin exterior body 3 and second principal surface m2 opposite to first principal surface m1, respectively. A part of anode body 6 exposed from resin exterior body 3 was connected to first external electrode 4a on the anode side with contact layer 4c and intermediate electrode layer 4b interposed therebetween. A part of cathode body 9 exposed from resin exterior body 3 was electrically connected to second external electrode 5a on the cathode side with intermediate electrode layer 5b interposed therebetween. Thus, solid electrolytic capacitor 11 was completed. Each of contact layer 4c and intermediate electrode layers 4b and 5b was formed by applying a silver paste containing silver particles and an epoxy resin and firing the paste. In the same manner as described above, a total of 20 solid electrolytic capacitors were produced.

(7) Evaluation

The following evaluation was performed by using the solid electrolytic capacitors.

(a) Measurement of ESR

ESR of the solid electrolytic capacitor was measured by the following procedure.

Under an environment of 20° C., electrostatic capacity (μF) of each electrolytic capacitor at a frequency of 120 Hz was measured, and ESR (mΩ) at a frequency of 100 kHz was measured by using an LCR meter for 4-terminal measurement. For each of the electrostatic capacity and the ESR, an average value of 20 solid electrolytic capacitors was obtained.

<<Solid Electrolytic Capacitor C1>>

A stacked body of capacitor elements was produced by stacking capacitor basic element E and cathode body 9 without using a carbon paste. A total of 20 solid electrolytic capacitors C1 were produced and evaluated in the same manner as in the case of solid electrolytic capacitor E1 except for the above description.

<<Solid Electrolytic Capacitor C2>>

A stacked body of capacitor elements was produced by stacking capacitor basic element E and cathode body 9 by using a silver paste instead of the carbon paste. A paste containing silver particles and an epoxy resin as a binder was used as the silver paste. By heating at 150° C. to 200° C. for 10 to 60 minutes, the binder contained in the coating film of the silver paste was cured to form a silver particle-containing layer. A total of 20 solid electrolytic capacitors C2 were produced and evaluated in the same manner as in the case of solid electrolytic capacitor E1 except for the above description.

The results of the evaluation are shown in Table 1. In Table 1, C1 and C2 are Comparative Examples. Table 1 also shows a type of the paste used for binding the capacitor basic element and the cathode body, and a volume proportion of conductive particles (first carbon particles or silver particles) to the dried solid content of the paste.

TABLE 1

|  | Paste | Proportion of conductive particles (volume %) | Cathode body | Electrostatic capacity (μF) | ESR (mΩ) |
|---|---|---|---|---|---|
| EA1 | Carbon paste | 50 | C-fired Al foil | 78.9 | 79.7 |
| EA2 |  |  | Ti-coated Al foil | 79.6 | 59.4 |
| EA3 |  |  | Ni-vapor-deposited Al foil | 78.8 | 68.0 |
| EA4 |  |  | C-vapor-deposited Al foil | 79.5 | 39.7 |
| EA5 |  |  | Cu foil | 79.0 | 28.2 |
| EA6 |  |  | Al foil | 82.5 | 493.7 |
| EA7 |  | 25 | C-fired Al foil | 71.8 | 503.9 |
| EA8 |  | 75 | C-fired Al foil | 71.4 | 241.4 |
| C1 | — | — | C-fired Al foil | 81.8 | 64002 |
| C2 | Silver paste | 50 | C-fired Al foil | 79.4 | 569.1 |

As shown in Table 1, in solid electrolytic capacitors EA1 to EA8 using the carbon paste of Example, almost same level of electrostatic capacity and smaller ESR are obtained as compared with solid electrolytic capacitor C2 using the silver paste. From the above results, it can be seen that sufficient performance is obtained by using a carbon paste which is lower in cost than the silver paste. Further, ESRs of solid electrolytic capacitors EA1 to EA8 using the carbon paste of Example are suppressed to be extremely low as compared with solid electrolytic capacitor C1 in which shown in FIG. 2 were produced by changing the configuration of the carbon paste, and characteristics thereof were evaluated. The configuration of the carbon paste and evaluation results of electrostatic capacity and ESR are shown in Table 2. Further, a reaction start, temperature of a curing agent and a volatilization temperature of a solvent used in solid electrolytic capacitors EB1 to EB10 are shown in Tables 3 and 4, respectively.

TABLE 2

|  | Binder resin | Curing agent | Solvent | Proportion of conductive particles (volume %) | Electrostatic capacity (μF) | ESR (mΩ) |
|---|---|---|---|---|---|---|
| EB1 | Bisphenol F type epoxy resin | 2P4MHZ-PW | α-terpineol | 50 | 518.2 | 3.81 |
| EB2 | Mixed resin (epoxy:polyester = 40:60) | 2P4MHZ-PW | Cyclopentanone | 50 | 521.2 | 5.36 |
| EB3 | Mixed resin (epoxy:polyester = 80:20) | 2P4MHZ-PW | Cyclopentanone | 50 | 521.4 | 7.29 |
| EB4 | Tetraphenylolethane type epoxy resin | 2P4MHZ-PW | Ethyl carbitol | 50 | 512.6 | 3.74 |
| EB5 | Bisphenol F type epoxy resin | 2P4MHZ-PW | Cyclohexanone | 50 | 518.5 | 7.57 |
| EB6 | Tetraphenylolethane type epoxy resin | 2P4MHZ-PW | Cyclohexanone | 50 | 519.8 | 5.19 |
| EB7 | Bisphenol F type epoxy resin | 2PHZ-PW | α-terpineol | 50 | 526.8 | 5.61 |
| EB8 | Mixed resin (epoxy:polyester = 80:20) | 2P4MHZ-PW | Cyclopentanone | 40 | 524.6 | 4.82 |
| EB9 | Mixed resin (epoxy:polyester = 80:20) | 2PHZ-PW | Cyclopentanone | 40 | 524.2 | 6.61 |
| EB10 | Mixed resin (epoxy:polyester = 80:20) | 2PHZ-PW | Cyclopentanone | 50 | 523.7 | 4.28 |

Mixed resin: bisphenol F type epoxy resin + polyester resin (mixed proportion)
2P4MHZ-PW: 2-phenyl-4-methyl-hydroxy methylimidazole
2PHZ-PW: 2-phenyl-4,5-dihydroxymethylimidazole capacitor basic element E and cathode body 9 are merely stacked without using the carbon paste. Further, in comparison between the results of solid electrolytic capacitors EA1, EA7, and EA8 in each of which the C-fired Al foil is used as the cathode body, the ESR of solid electrolytic capacitor EA1 in which the proportion of the conductive particles is 50 vol % is suppressed to be lower than the ESRs of solid electrolytic capacitors EA7 and EA8 in which the proportions of the conductive particles are 25 vol % and 75 vol %, respectively.

<<Solid Electrolytic Capacitors EB1 to EB10>>

In the same manner as in solid electrolytic capacitors EA1 to EA8, solid electrolytic capacitors (solid electrolytic capacitors EB1 to EB10) in which seven capacitor basic elements were stacked in solid electrolytic capacitor 11

TABLE 3

| Curing agent | Reaction start temperature (° C.) |
|---|---|
| 2P4MHZ-PW | 130 |
| 2PHZ-PW | 145 |

TABLE 4

| Solvent | Volatilization temperature (° C.) |
|---|---|
| α-terpineol | 219 |
| Cyclopentanone | 130 |

TABLE 4-continued

| Solvent | Volatilization temperature (° C.) |
|---------|-----------------------------------|
| Ethyl carbitol | 202 |
| Cyclohexanone | 156 |

Further, with respect to solid electrolytic capacitor EB7, residual volatile components were measured by component mass spectrometry and gravimetric analysis, and as a result, a residual organic volatile component per mass was 1157 μg/g, and a weight loss amount due to the residual volatile components was 0.6 wt %.

INDUSTRIAL APPLICABILITY

According to the present disclosure, an initial ESR of solid electrolytic capacitor can be suppressed to be low. Thus, the solid electrolytic capacitor element and the solid electrolytic capacitor can be used for various applications in which high reliability is required.

The invention claimed is:

1. A solid electrolytic capacitor comprising:
a stacked body in which a plurality of solid electrolytic capacitor elements are stacked;
an exterior body that seals the stacked body;
a first external electrode; and
a second external electrode, wherein:
each of the plurality of solid electrolytic capacitor elements including:
a capacitor basic element that includes an anode body, a dielectric layer disposed on a surface of the anode body, and a solid electrolyte layer covering at least a part of the dielectric layer;
a cathode body; and
a first carbon layer disposed between the capacitor basic element and the cathode body,
the first carbon layer contains first carbon particles in which an average particle size of primary particles is from 40 nm to 100 nm, inclusive,
a proportion of the first carbon particles in the first carbon layer is from 25 vol % to 75 vol %, inclusive,
a size of crystallite of the first carbon particles in a c-axis direction is more than or equal to 1.5 nm,
in each of the plurality of solid electrolytic capacitor elements, the anode body includes a pair of first ends facing each other, and the cathode body includes a pair of second ends facing each other,
the exterior body includes a first principal surface, a second principal surface intersecting the first principal surface, a third principal surface opposite to the first principal surface, and a fourth principal surface opposite to the second principal surface,
the plurality of solid electrolytic capacitor elements includes a first solid electrolytic capacitor element and a second solid electrolytic capacitor element which are stacked to be adjacent to each other,
one of the pair of first ends of the first solid electrolytic capacitor element is exposed from the first principal surface of the exterior body,
one of the pair of first ends of the second solid electrolytic capacitor element is exposed from the second principal surface of the exterior body, and
the one of the pair of first ends of the first solid electrolytic capacitor element and the one of the pair of first ends of the second solid electrolytic capacitor element are electrically connected to the first external electrode.

2. The solid electrolytic capacitor according to claim 1, wherein:
one of the pair of second ends of the cathode body in each of the plurality of solid electrolytic capacitor elements is exposed from the third principal surface of the exterior body to be electrically connected to the second external electrode, and
another of the pair of second ends of the cathode body in each of the plurality of solid electrolytic capacitor elements is exposed from the fourth principal surface of the exterior body to be electrically connected to the second external electrode.

3. The solid electrolytic capacitor according to claim 1, wherein a dibutyl phthalate oil absorption amount of the first carbon particles is less than or equal to 80 mL/100 g.

4. The solid electrolytic capacitor according to claim 1, wherein a BET specific surface area of the first carbon particles is less than or equal to 35 mg$^2$/g.

5. The solid electrolytic capacitor according to claim 1, wherein the first carbon layer further comprises a binder, and the binder contains at least one of a thermoplastic resin or a curable resin.

6. The solid electrolytic capacitor according to claim 5, wherein the binder contains the curable resin.

7. The solid electrolytic capacitor according to claim 6, wherein the curable resin includes an epoxy resin.

8. The solid electrolytic capacitor according to claim 7, wherein the epoxy resin includes a polyfunctional epoxy resin.

9. The solid electrolytic capacitor according to claim 8, wherein the polyfunctional epoxy resin is a tetraphenylolethane type resin.

10. The solid electrolytic capacitor according to claim 7, wherein the epoxy resin includes at least one of a bisphenol F type epoxy resin or a bisphenol A type epoxy resin.

11. The solid electrolytic capacitor according to claim 5, wherein the binder further contains a polyester resin.

12. The solid electrolytic capacitor according to claim 11, wherein a proportion of the polyester resin in the binder is less than or equal to 60 mass %.

13. The solid electrolytic capacitor element according to claim 1, wherein:
the capacitor basic element includes a second carbon layer disposed between the solid electrolyte layer and the first carbon layer, and
the second carbon layer contains second carbon particles in which an average particle size of primary particles is more than 100 nm.

14. The solid electrolytic capacitor element according to claim 1, wherein the cathode body includes at least a metal foil.

15. The solid electrolytic capacitor element according to claim 14, wherein the metal foil includes aluminum, an aluminum alloy, copper, or a copper alloy.

16. The solid electrolytic capacitor element according to claim 14, wherein:
the cathode body includes the metal foil and a surface layer disposed on a surface of the metal foil, and
the surface layer includes at least one selected from the group consisting of nickel, titanium, a titanium compound, and a carbonaceous material.

17. The solid electrolytic capacitor according to claim 1, wherein a residual organic volatile component per mass is less than or equal to 2000 μg/g.

18. The solid electrolytic capacitor according to claim 1, wherein a weight loss amount by a residual volatile component is less than or equal to 1.0 weight %.

19. A solid electrolytic capacitor element comprising:

a capacitor basic element that includes an anode body, a dielectric layer disposed on a surface of the anode body, and a solid electrolyte layer covering at least a part of the dielectric layer;

a cathode body; and a first carbon layer disposed between the capacitor basic element and the cathode body, wherein:

the first carbon layer contains first carbon particles in which an average particle size of primary particles is from 40 nm to 100 nm, inclusive, a proportion of the first carbon particles in the first carbon layer is from 25 vol % to 75 vol %, inclusive, the capacitor basic element includes a second carbon layer disposed between the solid electrolyte layer and the first carbon layer, the second carbon layer contains second carbon particles in which an average particle size of primary particles is more than 100 nm, and the capacitor basic element includes a metal particle-containing layer disposed between the first carbon layer and the second carbon layer.

20. The solid electrolytic capacitor element according to claim 19, wherein:

the first carbon layer is in contact with the cathode body, and the metal particle-containing layer is not interposed between the capacitor basic element and the cathode body.

*     *     *     *     *